United States Patent Office 2,781,233
Patented Feb. 12, 1957

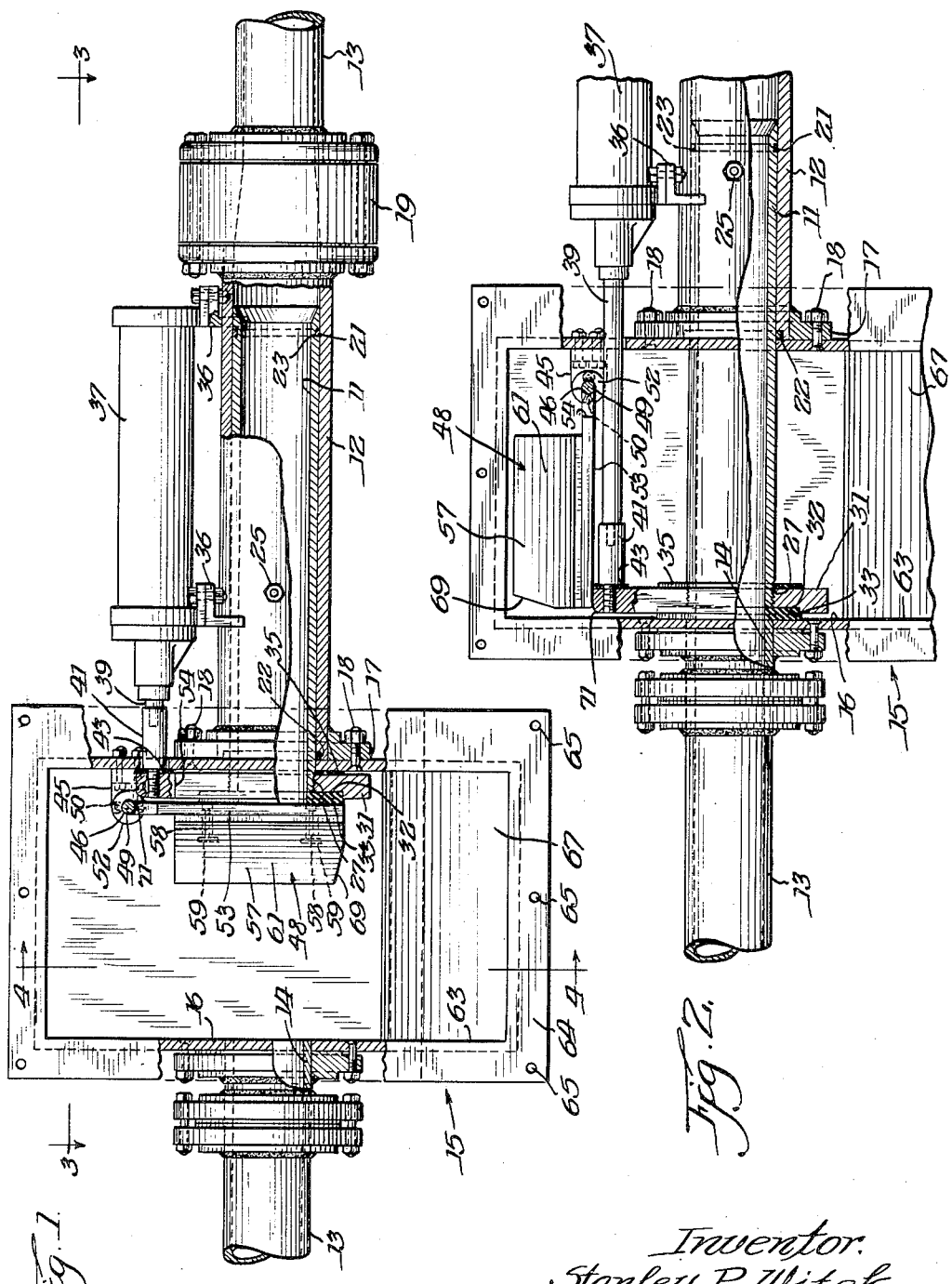

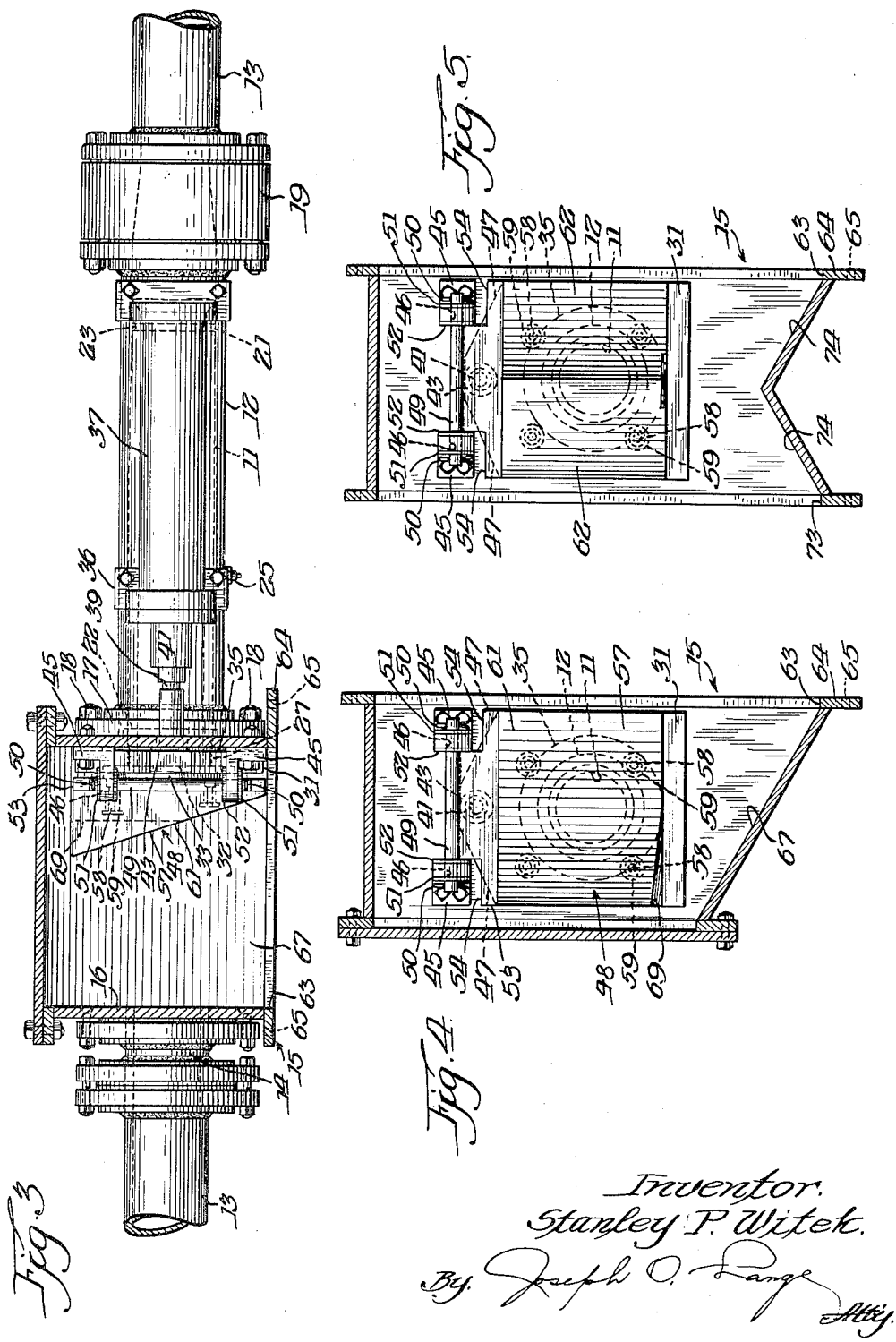

2,781,233

COMBINED PIPELINE SWITCH AND DIVERTER

Stanley P. Witek, Chicago, Ill., assignor to Crane Co., Chicago, Ill., a corporation of Illinois Application May 3, 1954, Serial No. 427,286

7 Claims. (Cl. 302—28)

This invention pertains to a combined pipeline switch and diverter, preferably used in conjunction with the transportation of granular or flowable materials or items, as, for example, sand, coal, flour, grain, syrup, milk, etc., including castings, bolts or the like. More particularly, the invention relates to a transfer switch in which a pipe section is adapted to be axially shiftable out of flow receiving position in the pipeline system to open up an alternate route for the fluid flow. The novel switch is provided with a deflector member which swings into interposed relation between the open end of said pipe section and source of the fluid flow to direct said flow into the alternate route. The switch of this invention may be conveniently employed, for example, in connection with a pneumatic transportation or conveyor system, such as that disclosed in U. S. patent application Serial No. 125,712, filed November 5, 1949, now Patent No. 2,714,043, July 26, 1955.

The present invention constitutes an improvement over co-pending application Serial No. 157,248, filed April 21, 1950, now Patent No. 2,639,196, May 19, 1953, for certain installations. This improvement is by way of eliminating the bend with its point of excessive wear and the production of a much simpler transfer switch of greatly reduced bulk and expense, because the present switch is much cheaper to produce and maintain and requires much less clearance in installation. The critical aspects have been eliminated with respect to registry of the plural conduits within the pipeline system and also the need of an additional air cylinder to effect fluid tight sealing thereof.

It is accordingly the objective of the present invention to provide an efficient, economical and compact method of changing the direction of flow of the above-mentioned general nature carried by such a pipeline.

Other objects and advantages will become more readily apparent upon proceeding with a reading of the specification in light of the accompanying drawings, in which Fig. 1 is an assembly view of a transfer switch embodying the present invention.

Fig. 2 is an enlarged fragmentary portion of Fig. 1, but showing the transfer switch in another operative position.

Fig. 3 is a sectional view taken on line 3—3 of Fig. 1.

Fig. 4 is a sectional view taken on line 4—4 of Fig. 1.

Fig. 5 is similar to Fig. 4, but illustrating a slightly modified form.

Similar reference numerals refer to similar parts throughout the several views.

According to a preferred form as illustrated in Figs. 1 to 4 of the drawings, a straight pipe or tube section 11 is slidable within a sleeve 12 connected to the pipeline 13, axially into sealed engagement with the end of the pipeline where it enters the switch or diverter housing 15 as shown at left in Fig. 1, the sealed relationship being shown in Fig. 2. For changing the straight line flow provided by that connection, the pipe section 11 is withdrawn from the extended position and a gate or deflector member 48 is permitted to swing into the path of the inflowing material for directing the same into transverse flow as for instance into a branch pipeline or a receiving chamber.

Specifically, the pipeline is preferably provided with a section 14 for actual connection to the housing 15, this section being adapted to extend through the front plate 16 of the latter so as to preferably be engageable with the pipe section 11 in its extended position. The section 14 which is bolted between the regular section of pipe and the housing as indicated, through the flanges provided at each of its ends, is easily replaceable and acts as a liner or wear edge for the front of the housing. This section may be of hard or hardened metal to better withstand abrasion as for the conveyance of sand or the like.

Connected to the opposite side or rear of the housing 15 and in alignment with the section 14 is a pipe or tube section 12, the connection being made through the flange 17 as by means of studs 18 extending from the housing and nuts tightened thereon as indicated. At the other end of the pipe 12 is mounted a reducer 19 which is in turn connected to a regular section of the pipeline. The switch of the present invention is thus inserted in the pipeline 13.

The section 12 acts as a sleeve or housing for the inner pipe 11 when in the retracted position shown in Fig. 1 of the drawing and as a conduit in the direct line of conveyance of the material moved when the inner pipe is extended as shown in Fig. 2. The inner pipe section is maintained in substantial coaxial alignment within the sleeve 12 and with the pipe section 14 by means of piston rings 21 and 22, although such rings or other suitable packing or seals are not necessarily essential to this alignment. Preferably, a split expansion type piston ring is employed at 21 being received within an annular groove 23 near the outlet end of the pipe 11 while a contracting type split ring is provided at 22 between the end of the sleeve and the rear of the housing 15 and within the annular relief of the former. These rings are easily replaceable and bear respectively on the inside of the sleeve and outer surface of the inner pipe to keep the clearance between the two parts clean and free from accumulation whatever the relative position. The rings therefore have an important wiping and sealing function besides serving as means of alignment of the reciprocally movable inner member. A fitting may be provided as at 25 for the admission of lubricant and sealant between the pipe sections.

At the inner or inlet end of the pipe section 11 is mounted a flat head or plate portion 31 as by threading at 27. This portion is annularly relieved at 32 for snug reception therewithin of an annular seal 33. This seal extends inwardly of the head portion and is adapted to engage the front of the housing or more particularly the end of the pipe section 14 when the section 11 is in the extended position, thus to seal the connection between the two sections in this position. A rubber gasket 35 is provided between the head portion and rear of the housing to seal against the admission of material between the inner section 11 and sleeve or outer section 12 in the retracted position of the switch.

Mounted on top of the sleeve by any suitable means as through brackets 36 is an air cylinder 37 of conventional type, although other types of prime movers may be employed. Secured to the stem 39 of the air cylinder as by threading is an extension rod 41 which projects through the rear of the housing and into threaded reception within the top of the head portion 31. A rubber gasket 43 is provided between the extension rod and head for sealing engagement with the inside of the housing in the retracted position of the switch.

Suitably attached to the rear of the housing as by bolts shown are a pair of spaced arms or brackets 45 containing aligned bores or apertures 46. It should be noted that the head portion 31 of the telescopically mounted pipe section 11 is tapered or relieved at the top at 47 on each side to permit mounting of the brackets 45 and to provide for proper clearance around the same. Extending through the bores 46 of the brackets is the pin portion 49 of a swinging gate generally designated 48. The pin portion here constituting a continuous rod or shaft is retained in proper operating position within the brackets 45 by means of cotter pins 50 and washers 51 inwardly thereof. Additional washers 52 are provided between the bracket arms and depending plate portion 53 of the gate.

The plate portion or gate proper is welded or otherwise secured to the hinge pin or rod 49 and is of such proportions as to entirely cover the inlet end of the pipe section 11 in the retracted position. Actually, the plate portion contacts the rubber seal 33 in this position, thus preventing the admission of the material of fluid transported into the open end of this member. The top of the plate is cut out at 54 on each side to permit projection of the brackets 45 for the support of the member.

Attached to the front of the plate 53 is a deflector member 57 preferably constructed of hard rubber or the like having substantial resistance to wear and abrasion. This member is attached by means of screws 58 passing through the plate 53 and into threaded inserts 59 molded or otherwise secured in the member. The latter may therefore be easily replaced should it become worn.

The deflector member is generally triangular in shape as best seen in Fig. 3, presenting a laterally facing incline or plane surface 61. This surface is so disposed as to direct the stream of fluid or pneumatically conveyed material striking the same to the side through the opening 63 in the switch housing. The latter is flanged at 64 for connection through holes 65 to a receiving chamber of suitable construction (not shown) or a hopper for discharge at a station as for foundry use, or the material may be channeled into a branch pipeline for conveyance to a distant station. Other switches of the above or different type may be employed in the main or branch lines as desired. The deflector member may, of course, direct the material downwardly rather than to the side, into suitable collection or storage means or directly into a branch line connected to the bottom of the housing. As shown, the bottom plate 67 of the housing is inclined so as to prevent accumulation of the material and to cause the same to move through the opening in the side. The bottom of the deflector member is cut off or relieved at 69 to provide ample clearance between the gate and front plate 16 of the housing when the former is swung upwardly.

In operation, the pipe section 11 is normally in extended position and in sealed relation with the front plate 16 or end of section 14 for straight line flow through the switch housing and projecting sleeve (see Fig. 2). When it is desired to divert the flow into a discharge station or branch line, the air cylinder 37 is energized to move the pipe section 11 to the right into the retracted or fully telescoped position shown in Fig. 1. The gate 48 is thereby released from its raised position illustrated in Fig. 2 by the withdrawing conduit section and swings into position over the open end of the conduit into sealed contact with the slightly protruding annular seal 33. The gate in its lower position is directly in the line of fluid flow through the open inlet end of the connecting pipe section 14 and deflects or diverts that flow into transverse movement through the open side of the housing by impingement thereof with the inclined surface 61 of the deflector member secured to the gate. The surface 61, of course, does not necessarily have to be flat, but may be curved or otherwise shaped to properly direct the stream. Or, the stream may be split into two lines of flow by oppositely disposed plane or curved surfaces in lieu of the single one shown. Fig. 5 shows such a construction in which the oppositely disposed surfaces are designated 62. In this form, the other side of the housing is open at 73 to permit fluid flow therethrough, the bottom having oppositely disposed inclined surfaces 74.

Operation of the air cylinder in the opposite direction returns the shiftable conduit section 11 to its original position to reestablish the straight line fluid flow through the device. During this extension movement, the gate is displaced from the lowermost closed position by the advancing head portion 31 which cams the same outwardly and upwardly into the raised position by sliding engagement between the top edge of the head portion, rounded at 71 for smooth action, and the rear face of the gate, the line of contact between the two advancing across the face of the latter during the movement. When the movement is complete, the gate rests on top of the head portion in the position shown in Fig. 2, being contained within the upper part of the casing or housing. The gate or closure member is therefore removed from the line of flow, but is immediately capable of swinging down under its own weight into flow intercepting, directing position when the connection between pipe sections 11 and 14 is broken and the former shifted towards the right as seen in Fig. 1. The gate, however, need not be mounted above the section 11 but may be mounted to one side of the same, being biased into the closed or flow deflecting position by spring action and cammed into the open position as before, although positive linkage between the gate and head portion or air cylinder may be employed for movement into the open and closed positions.

It should be evident from the above description that unique means has been presented for redirecting the flow of material or substance through pipelines or conduits. Although granular or finely divided material capable of fluid flow either under the action of gravity or with the help of air under pressure or liquid has been mentioned, the present invention is not necessarily limited to the conduction and control of such material, but the principles thereof are applicable to the movement of ordinary fluids including true liquids. Also, the device of the present invention does not need to be installed horizontally as shown, but the same may be turned so that the pipeline runs through it vertically or at an angle. In the latter positioning, a counterbalancing or other arrangement may be employed to bias or otherwise move the gate into fluid deflecting or closed position. The vertical or inclined run of the conduit would facilitate movement of the material or flowable items, such as already has been suggested, by the action of gravity. It should also be made clear that the present invention is not restricted to use in pipeline systems in the usual sense of the term, but may be installed vertically under a bin or open hopper, for instance, for controlling or directing the flow coming to it through a connecting conduit or pathway. In certain installations, the device may be mounted vertically or horizontally directly within a receiver or hopper without the need of a special housing. In this case, a double deflector such as that shown in Fig. 5 would be preferably used to spread the material for more uniform filling. Or, the device may be only partly contained within the receiver or hopper, the conduit section 11 entirely withdrawing from the enclosure in the retracted position. A portion of the side wall of the receiver or hopper may be adapted to swing inwardly in flapper fashion for admission of the section 11 when moving into the extended position, the flapper serving as a deflector or closure means to prevent the escape of material through the opening in the side after retraction or withdrawal of the conduit section 11. Also, it is not necessary in all cases that the deflector contact the end of the inner pipe 11 for closure purposes in the retracted position, but the deflector may remain spaced therefrom and still prevent the inflow of material or items within the open end of the same. It is also possible to eliminate the deflector means entirely, if the inner pipe is retracted far enough and the pressure or impetus of the outflow is not too great.

It should be especially noted that the present device in its usual form and the one illustrated is in the nature of a valve or stop and one possessing a certain pressure sealing by virtue of the force exerted by the fluid flow in the direction of closing. The principles of the invention may be applied in certain instances to a valve or fluid stop having no provision for diversion or alternate flow.

It is therefore the desire not to limit the present invention to the specific forms and purposes disclosed, but the same is capable of other forms and adaptations which are properly included within the terms of the appended claims.

I claim:

1. In a flow control device, the combination comprising first and second conduit means arranged for the interchange of fluid flow therebetween, one of said conduit means being axially movable away from the other out of the interchange position, said conduit means having end portions in substantial alignment at least in the interchange position, combined closure and deflector means swingable into substantially sealed engagement with said second conduit means after movement of the movable conduit means out of the interchange position to prevent fluid admission within the second conduit means, said combined means being engageable with an end portion of the said axially movable conduit and being adapted to deflect the fluid discharge from said first conduit means into transverse flow when in the sealed engagement, said second conduit means by predetermined engagement with said combined means being adapted to limit movement of said combined means and position the same through the sealed engagement therewith for the deflective action and to receive the force exerted against the combined closure and deflector means by the fluid flow impinging thereon, the exertion of the force providing at least in part for sealing action, and means positioning the conduit means and combined means in operative relation with each other.

2. In a conduit line including a section thereof with an open end portion, a fluid flow transfer switch or the like comprising in combination a housing recessed for the admission of the open end portion of the conduit section, tubular means affixed to the opposite side of said housing from said conduit section, said tubular means being adapted to be connected to another portion of the conduit line and to serve as a conduit in cooperation therewith, a conduit section adapted to connect the said conduit section of the conduit line with said tubular means for continuity of fluid flow therebetween, the connecting conduit section being positioned within said tubular means for extension into and retraction from fluid conducting engagement with the said conduit section of the conduit line, said connecting conduit section having an enlarged head portion including sealing means, the latter sealing means being engageable with the said conduit section of the conduit line in the extended position of said connecting section for fluid tight connection therebetween, gate means mounted on said housing for swinging movement over the exposed end of said connecting conduit section in the retracted position thereof into substantial fluid sealed engagement with said sealing means of the same, said gate means being adapted to deflect fluid flow from the said conduit section of the conduit line when the gate is in sealed engagement with said connecting section into transverse flow into at least one alternate route of flow, said housing being open at at least one area for passage of the transverse flow, means associated with the head portion of said connecting conduit section for the extension and retraction of the latter section, said gate means being swingable out of the fluid deflecting position upon movement of said connecting conduit section into the extended position.

3. In a conduit line including a section thereof with an open end portion, a fluid flow transfer switch or the like comprising in combination a housing recessed for the admission of the open end portion of the conduit section, tubular means affixed to the opposite side of said housing from said conduit section, said tubular means being adapted to be connected to another portion of the conduit line and to serve as a conduit in cooperation therewith, a conduit section adapted to connect said conduit section of the conduit line with said tubular means for continuity of fluid flow therebetween, the connecting conduit section being positioned within said tubular means for extension into and retraction from fluid conducting engagement with the said conduit section of the conduit line, said connecting conduit section having an enlarged head portion including sealing means, the latter sealing means being engageable with the said conduit section of the conduit line in the extended position of said connecting section for fluid tight connection therebetween, gate means mounted on said housing for swinging movement over the exposed end of said connecting conduit section in the retracted position thereof into substantial fluid sealed engagement with said sealing means of the same, said gate means being triangular in cross-section to provide a laterally facing inclined surface adapted to deflect fluid flow the said conduit section of the conduit line when the gate is in sealed engagement with said connecting section into transverse flow into at least one alternate route of flow, said housing being open at at least one area for passage of the transverse flow, means associated with the head portion of said connecting conduit section for the extension and retraction of the latter section, gate journalling means cooperating with said extension means whereby said gate means is movable out of the fluid deflecting position upon movement of said connecting conduit section into the extended position.

4. In a conduit line including a section thereof with an open end portion, a fluid flow transfer switch or the like comprising in combination a housing recessed for the admission of the open end portion of the conduit section, tubular means affixed to the opposite side of said housing from said conduit section, said tubular means being adapted to be connected to another portion of the conduit line and to serve as a conduit in cooperation therewith, a conduit section adapted to connect said conduit section of the conduit line with said tubular means for continuity of fluid flow therebetween, the connecting conduit section being positioned within said tubular means for extension into and retraction from fluid conducting engagement with the said conduit section of the conduit line, said connecting conduit section having an enlarged head portion including sealing means, the latter sealing means being engageable with the said conduit section of the conduit line in the extended position of said connecting section for fluid tight connection therebetween, gate means mounted on said housing for swinging movement over the exposed end of said connecting conduit section in the retracted position thereof into substantial fluid sealed engagement with said sealing means of the same, said gate means having inclined surfaces thereon adapted to deflect fluid flow from the said conduit section of the conduit line when the gate is in sealed engagement with said connecting section into transverse flow into at least one alternate route of flow, said housing being open at at least one area for passage of the transverse flow, the said housing having lower inclined surface means cooperating with the fluid flow deflection by the said gate means to prevent the accumulation of flowable material, means associated with the head portion of said connecting conduit section for the extension and retraction of the latter section, said gate means being movable out of the fluid deflecting position upon movement of said connecting conduit section into the extended position.

5. In a conduit line including a section thereof with an open end portion, a fluid flow transfer switch or the like comprising in combination a housing recessed for the admission of the open end portion of the conduit section, tubular means affixed to the opposite side of said housing from said conduit section, said tubular means being adapted to be connected to another portion of the conduit line and to serve as a conduit in cooperation therewith, a conduit section adapted to connect said conduit section of the conduit line with said tubular means for continuity of fluid flow therebetween, the connecting conduit section being positioned within said tubular means for extension into and retraction from fluid conducting engagement with the said conduit section of the conduit line, said connecting conduit section having an enlarged head portion including sealing means, the latter sealing means being engageable with the said conduit section of the conduit line in the extended position of said connecting section for fluid tight connection therebetween, gate means mounted on said housing for swinging movement over the exposed end of said connecting conduit section in the retracted position thereof into substantial fluid sealed engagement with said sealing means of the same, said gate means having converging inclined surfaces to deflect fluid flow from the said conduit section of the conduit line when the gate is in sealed engagement with said connecting section, said housing being open at a lower portion thereof for passage of the transverse flow in a plurality of directions, means associated with the head portion of said connecting conduit section for the extension and retraction of the latter section, said gate means being swingable out of the fluid deflecting position upon predetermined axial movement of said connecting conduit section.

6. In a conduit line including a section thereof with an open end portion, a fluid flow transfer switch or the like comprising in combination a housing recessed for the admission of the open end portion of the conduit section, tubular means affixed to the opposite side of said housing from said conduit section, said tubular means being adapted to be connected to another portion of the conduit line and to serve as a conduit in cooperation therewith, a conduit section adapted to connect said conduit section of the conduit line with said tubular means for continuity of fluid flow therebetween, the connecting conduit section being positioned within said tubular means for extension into and retraction from fluid conducting engagement with the said conduit section of the conduit line, said connecting conduit section having a head portion including sealing means, the latter sealing means being engageable with the said conduit section of the conduit line in the extended position of said connecting section for fluid tight connection therebetween, gate means mounted on said housing for movement outwardly and upwardly relative to the exposed end of said connecting conduit section in the retracted position thereof into substantial fluid sealed engagement with said sealing means of the same, said gate means having a surface portion slidably engageable with said head portion of the connecting conduit section whereby to move predeterminately to deflect fluid flow from the said conduit section of the conduit line when the gate is in sealed engagement with said connecting section into transverse flow into at least one alternate route of flow, said housing being open at at least one area for passage of the transverse flow, means associated with the head portion of said connecting conduit section for effecting the extension and retraction of the latter section, said gate means being movable entirely out of fluid deflecting position upon predetermined axial movement of said connecting conduit section in a direction towards said gate.

7. In a conduit line including a section thereof with an open end portion, a fluid flow transfer switch or the like comprising in combination a housing recessed for the admission of the open end portion of the conduit section, tubular means affixed to the opposite side of said housing from said conduit section, said tubular means being adapted to be connected to another portion of the conduit line to serve as a conduit in cooperation therewith, a conduit section adapted to connect said conduit section of the conduit line with said tubular means for continuity of fluid flow therebetween, the connecting conduit section being axially movable telescopically relative to said tubular means for its extension into and retraction from fluid conducting engagement with the said conduit section of the conduit line, said connecting conduit section having a head portion including sealing means, the latter sealing means being engageable with the said conduit section of the conduit line in the extended position of said connecting section for fluid tight connection therebetween, gate means in the said housing mounted for swinging movement relative to the inner end of said connecting conduit section in the retracted position thereof into substantial fluid sealed engagement with said sealing means of the same, said gate means being adapted to deflect fluid flow from the said conduit section of the conduit line when the gate is in sealed engagement with said connecting section into transverse flow into at least one alternate route of flow, said housing having an outlet at at least one area thereof for passage therethrough of the transverse flow, cam-like surface means associated with the head portion of said connecting conduit section cooperating with said gate for effecting movement of the gate upon extension and retraction of the connecting conduit section, said gate means being swingable out of the fluid deflecting position upon movement of said connecting conduit section into the extended position.

References Cited in the file of this patent

UNITED STATES PATENTS

| 1,538,027 | Cushing | May 19, 1925 |
| 2,380,311 | Hornbrook | July 10, 1945 |
| 2,581,853 | Glaza | Jan. 8, 1952 |